United States Patent
Kreienheder et al.

(10) Patent No.: US 10,359,287 B2
(45) Date of Patent: Jul. 23, 2019

(54) COORDINATING SENSOR PLATFORMS PERFORMING PERSISTENT SURVEILLANCE

(71) Applicant: The Boeing Company, Chicago, IL (US)

(72) Inventors: Charles Robert Kreienheder, Kirkwood, MO (US); Gregory L. Sheffield, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 729 days.

(21) Appl. No.: 14/561,876

(22) Filed: Dec. 5, 2014

(65) Prior Publication Data
US 2017/0199039 A1 Jul. 13, 2017

(51) Int. Cl.
G01C 21/00 (2006.01)
G01C 11/02 (2006.01)
B64D 47/08 (2006.01)
B64C 39/02 (2006.01)
G01S 13/88 (2006.01)
G01S 13/00 (2006.01)
G01S 13/90 (2006.01)
G05D 1/00 (2006.01)
G05D 1/10 (2006.01)

(52) U.S. Cl.
CPC .......... G01C 21/005 (2013.01); B64C 39/024 (2013.01); B64D 47/08 (2013.01); G01C 11/02 (2013.01); G01S 13/003 (2013.01); G01S 13/88 (2013.01); G01S 13/90 (2013.01); G05D 1/0094 (2013.01); G05D 1/104 (2013.01); B64C 2201/123 (2013.01)

(58) Field of Classification Search
CPC .. G05D 1/0044; G05D 1/0274; G01S 13/003; G01S 13/88; G01S 13/90; G01S 13/9035
USPC ................................ 342/22, 29–32, 702, 52
See application file for complete search history.

(56) References Cited

U.S. PATENT DOCUMENTS

| | | | |
|---|---|---|---|
| 6,480,009 B1 * | 11/2002 | Gelfand | G01N 27/023 324/445 |
| 8,325,178 B1 | 12/2012 | Doyle, Jr. | |
| 8,396,256 B2 | 3/2013 | Lu et al. | |
| 8,639,369 B1 | 1/2014 | Hirsch et al. | |
| 8,711,218 B2 * | 4/2014 | Zehavi | G01S 5/16 348/143 |
| 8,848,983 B1 | 9/2014 | Brewington et al. | |
| 2004/0030448 A1 | 2/2004 | Solomon | |
| 2008/0158256 A1 | 7/2008 | Russell et al. | |

(Continued)

OTHER PUBLICATIONS

Extended European Search Report, dated Jun. 10, 2016, regarding application 15198100.8, 9 pages.

(Continued)

Primary Examiner — Peter M Bythrow
Assistant Examiner — Helena H Seraydaryan
(74) Attorney, Agent, or Firm — Yee & Associates, P.C.

(57) ABSTRACT

A method and apparatus for controlling a set of sensor platforms. The apparatus comprises a map manager and a controller. The manager creates a visibility map for an area of interest for a set of sensor platforms. The map manager further updates the visibility map over time while the set of sensor platforms monitors the area of interest. The controller controls a route of each of the set of sensor platforms using the visibility map.

20 Claims, 11 Drawing Sheets

(56) References Cited

U.S. PATENT DOCUMENTS

2014/0222248 A1  8/2014  Levien et al.
2014/0316616 A1  10/2014  Kugelmass

OTHER PUBLICATIONS

Wang et al., "Generating Viewsheds without Using Sightlines," American Society for Photogrammetry and Remote Sensing, Photogrammetric Engineering & Remote Sensing, vol. 66, No. 1, Jan. 2000, pp. 87-90.

* cited by examiner

COORDINATING SENSOR PLATFORMS PERFORMING PERSISTENT SURVEILLANCE

BACKGROUND INFORMATION

1. Field

The present disclosure relates generally to persistent surveillance. More particularly, the present disclosure relates to a method and apparatus for controlling the routing of a set of sensor platforms performing persistent surveillance of an area of interest using a dynamic visibility map of the area of interest.

2. Background

Persistent surveillance is surveillance that is performed over an area of interest over a prolonged period of time. Persistent surveillance may also be referred to as persistent intelligence, surveillance, and reconnaissance (ISR). Persistent surveillance may be performed using different types of imaging systems. These imaging systems may be attached to platforms, such as unmanned aerial vehicles (UAVs).

For example, a group of unmanned aerial vehicles having attached imaging systems may be flown over an area of interest to monitor the area of interest for a selected period of time. The imaging system attached to each of the group of unmanned aerial vehicles may have a field of view that covers at least a portion of the area of interest. However, depending on the type of area being monitored, each imaging system may not have a direct line of sight to the portion of the area of interest within its field of view. For example, terrain features, such as hills and mountains, may obstruct the line of sight from an imaging system to the surface of the area. Similarly, when the area of interest is an urban area, urban features such as buildings, man-made structures, bridges, antenna towers, and other types of features may obstruct the line of sight from an imaging system to the surface of the area.

Further, depending on the positioning of the group of unmanned aerial vehicles, not all of the area of interest may be visible to at least one of the group of unmanned aerial vehicles at any given point in time. Consequently, surveillance of the area of interest may not be as thorough as desired.

Some currently available methods for coordinating a group of sensor platforms may rely on predetermined search patterns. These predetermined search patterns may include, for example, without limitation, a creeping line pattern, a sector search pattern, a spiral pattern, and a square pattern. However, with these types of methods, surveillance may be constrained to a definite period of time—the time it takes to complete a particular predetermined search pattern. Further, these types of currently available methods may not allow for sensor platforms to join in and leave the group of sensor platforms performing the surveillance over time. Therefore, it would be desirable to have a method and apparatus that take into account at least some of the issues discussed above, as well as other possible issues.

SUMMARY

In one illustrative embodiment, an apparatus comprises a map manager and a controller. The manager creates a visibility map for an area of interest for a set of sensor platforms. The map manager further updates the visibility map over time while the set of sensor platforms monitors the area of interest. The controller controls a route of each of the set of sensor platforms using the visibility map.

In another illustrative embodiment, a method for controlling a set of sensor platforms is provided. A visibility map is created for an area of interest for the set of sensor platforms. The visibility map is updated over time as the set of sensor platforms monitor the area of interest. A route of each of the set of sensor platforms is controlled using the visibility map.

In yet another illustrative embodiment, a persistent surveillance system comprises a set of sensor platforms, a map manager, and a controller. The set of sensor platforms monitor an area of interest. The map manager creates a visibility map for the area of interest for the set of sensor platforms. The map manager further updates the visibility map over time while the set of sensor platforms monitors the area of interest. The controller controls a route of each of the set of sensor platforms using the visibility map to achieve a highest collective visibility of the area of interest over time.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to perform persistent surveillance in a manner that maintains a maximal line-of-sight from sensor platform to surface for multiple sensor platforms. In particular, it may be desirable to have a method for coordinating these sensor platforms in a manner that yields the highest collective visibility of an area of interest to the sensor platforms over time. Further, the illustrative embodiments recognize and take into account that it may be desirable to perform this type of coordination of the sensor platforms for a period of time that is indefinite or unknown.

Thus, the illustrative embodiments provide a method and apparatus for controlling a set of sensor platforms. In one illustrative example, a visibility map is created for an area of interest for the set of sensor platforms. The visibility map is updated over time as the set of sensor platforms monitor the area of interest. A route of each of the set of sensor platforms is controlled using the visibility map.

Figure 1:
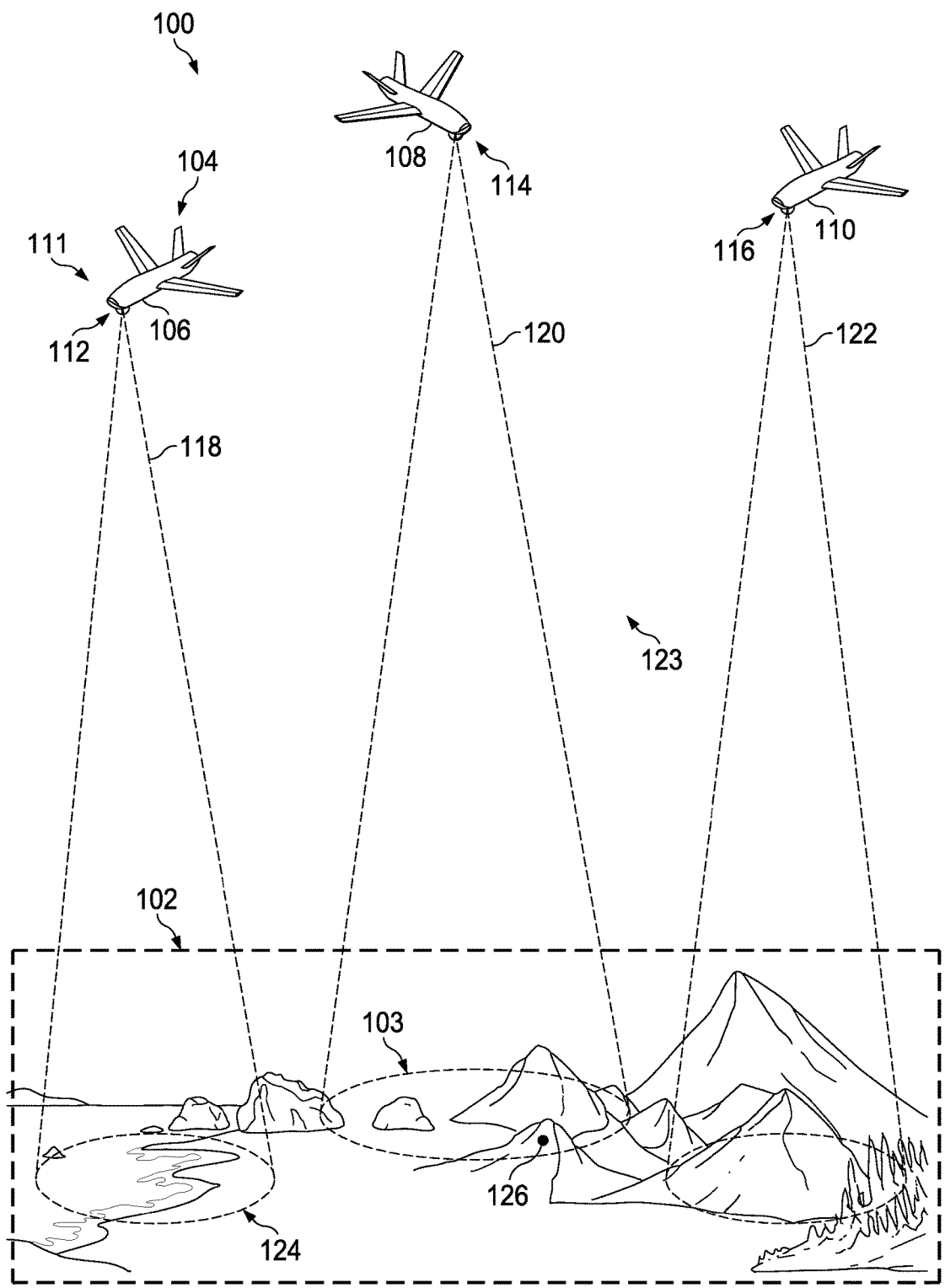
FIG. 1 is an illustration of a surveillance environment in accordance with an illustrative embodiment.

Referring now to the figures and, in particular, with reference to FIG. 1, an illustration of a surveillance environment is depicted in accordance with an illustrative embodiment. In this illustrative example, surveillance environment 100 may be an environment in which area of interest 102 may be monitored. Area of interest 102 may be an area of terrain 103 in this example.

As depicted, set of sensor platforms 104 may be used to perform persistent surveillance of area of interest 102. As used herein, a "set of" items may include one or more items. In this manner, set of sensor platforms 104 may include one or more sensor platforms.

Each of set of sensor platforms 104 may take the form of an unmanned aerial vehicle (UAV) in this illustrative example. Set of sensor platforms 104 may include sensor platform 106, sensor platform 108, and sensor platform 110. Set of sensor systems 111 may be associated with set of sensor platforms 104. Set of sensor systems 111 include sensor system 112 associated with sensor platform 106, sensor system 114 associated with sensor platform 108, and sensor system 116 associated with sensor platform 110.

In this illustrative example, sensor system 112, sensor system 114, and sensor system 116 may be imaging systems. These imaging systems may take the form of electro-optical imaging systems, radar imaging systems, laser imaging systems, infrared imaging systems, ultraviolet imaging systems, or other types of imaging systems.

As depicted, sensor system 112, sensor system 114, and sensor system 116 have field of view 118, field of view 120, and field of view 122, respectively. However, depending on the position of each of these sensor systems in air 123, one or more of these sensor systems may not have an unobstructed line of sight to every location on ground 124 within the corresponding field of view of these one or more sensor systems. For example, without limitation, location 126 may not be visible to sensor system 114 in this illustrative example. In other words, the line of sight between sensor system 114 and location 126 on ground 124 may be obstructed by terrain 103.

As used herein, a position, such as the position of a sensor system, may include a location, an orientation, or both. A location may be a two-dimensional location or a three-dimensional location within a coordinate system, depending on the implementation.

A controller (not shown) at, for example, without limitation, a ground station (not shown) may be used to control set of sensor platforms 104 to yield a highest level of collective visibility of area of interest 102 over time. The collective visibility of area of interest 102 with respect to set of sensor platforms 104 at a given point of time may be measured based on the number of locations on ground 124 that are visible to at least one of set of sensor platforms 104 at a given point in time. The greater the number of locations that are visible to at least one of set of sensor platforms 104, the higher the collective visibility. An example of one manner in which a controller for controlling set of sensor platforms 104 may be implemented is described in greater detail in FIG. 3 below.

Figure 2:
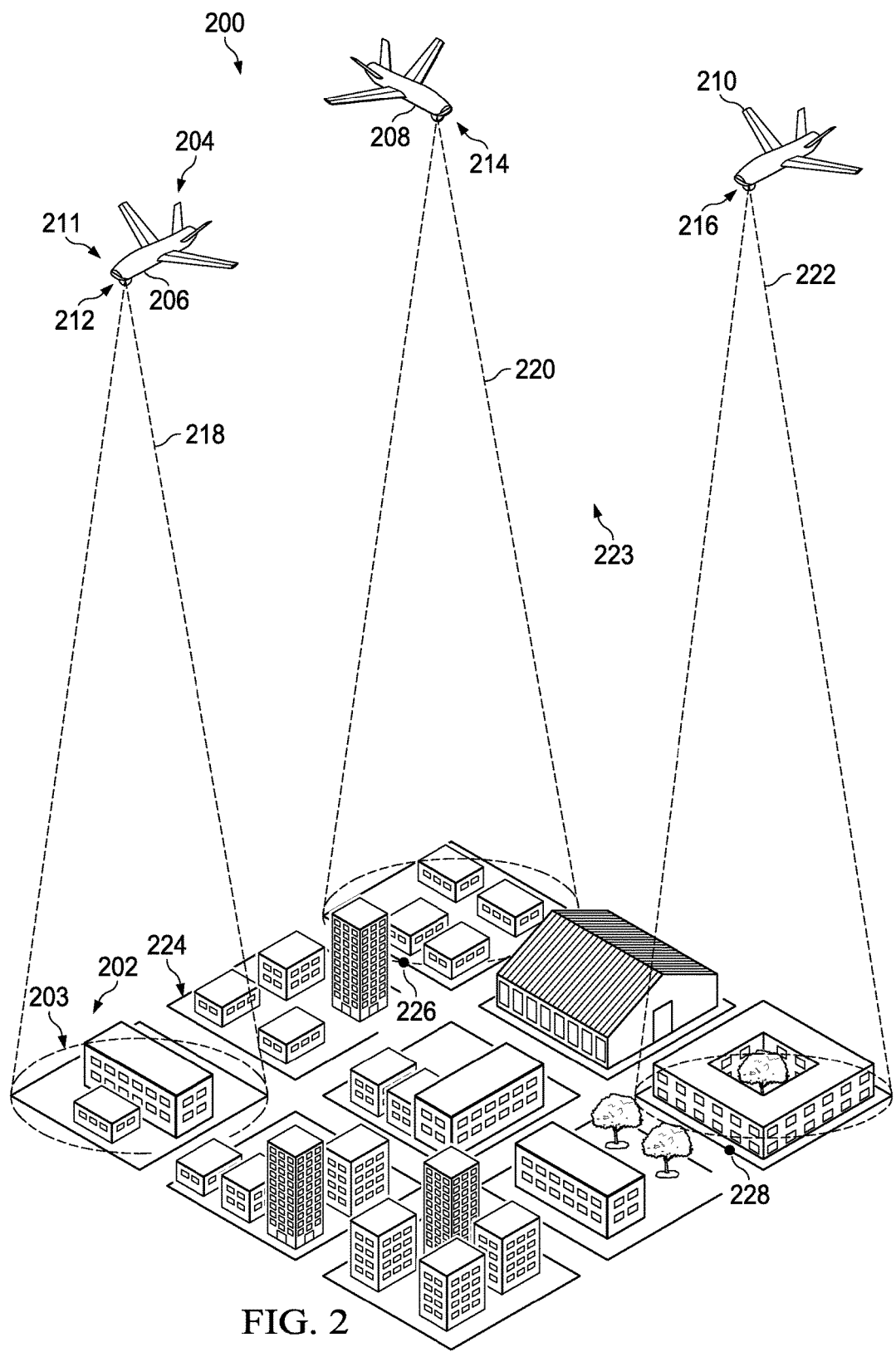
FIG. 2 is an illustration of another surveillance environment in accordance with an illustrative embodiment.

With reference now to FIG. 2, an illustration of another surveillance environment is depicted in accordance with an illustrative embodiment. In this illustrative example, surveillance environment 200 may be an environment in which area of interest 202 may be monitored. Area of interest 202 may be urban area 203 in this example.

As depicted, set of sensor platforms 204 may be used to perform persistent surveillance of area of interest 202. Each of set of sensor platforms 204 may take the form of an unmanned aerial vehicle (UAV) in this illustrative example.

Set of sensor platforms 204 may include sensor platform 206, sensor platform 208, and sensor platform 210. Set of sensor systems 211 may be associated with set of sensor platforms 204. Set of sensor systems 211 include sensor system 212 associated with sensor platform 206, sensor system 214 associated with sensor platform 208, and sensor system 216 associated with sensor platform 210.

In this illustrative example, sensor system 212, sensor system 214, and sensor system 216 may be imaging systems. These imaging systems may take the form of electro-optical imaging systems, radar imaging systems, laser imaging systems, infrared imaging systems, ultraviolet imaging systems, or other types of imaging systems.

As depicted, sensor system 212, sensor system 214, and sensor system 216 have field of view 218, field of view 220, and field of view 222, respectively. However, depending on the position of each of these sensor systems in air 223, one or more of these sensor systems may not have an unobstructed line of sight to every location on ground 224 within the corresponding field of view of these one or more sensor systems. For example, without limitation, location 226 may not be visible to sensor system 214 in this illustrative example. Similarly, location 228 may not be visible to sensor system 216. In particular, the line of sight between sensor system 214 and location 226 on ground 224 and the line of sight between sensor system 216 and location 226 on ground 224 may be obstructed by the various buildings and man-made structures in urban area 203.

A controller (not shown) at, for example, without limitation, a ground station (not shown) may be used to control set of sensor platforms 204 to yield a highest level of collective visibility of area of interest 202 over time. An example of one manner in which this may be implemented is described in greater detail in FIG. 3 below.

Figure 3:
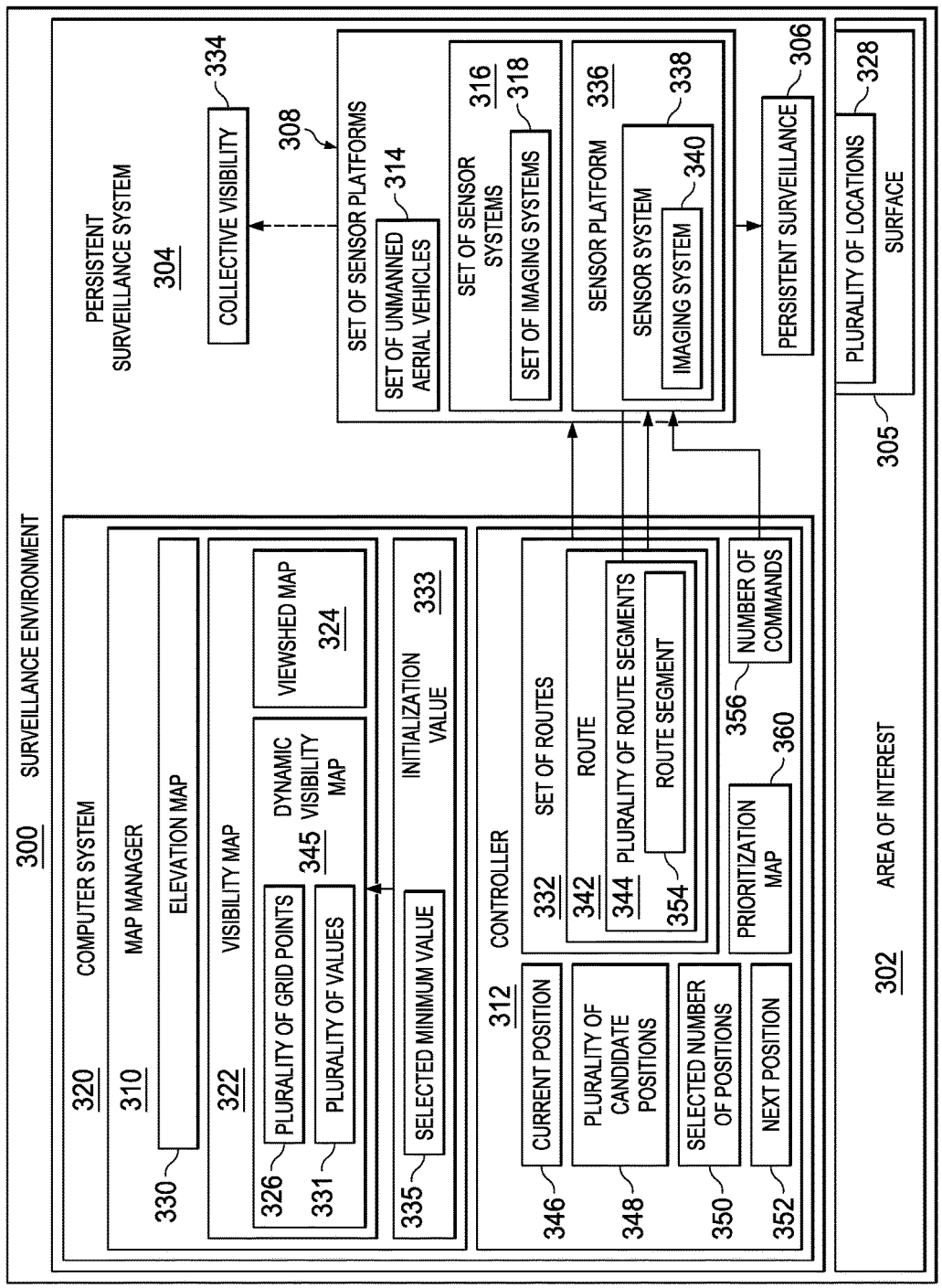
FIG. 3 is an illustration of a surveillance environment in the form of a block diagram in accordance with an illustrative embodiment.

With reference now to FIG. 3, an illustration of a surveillance environment is depicted in the form of a block diagram in accordance with an illustrative embodiment. Surveillance environment 300 may be any environment having area of interest 302.

Surveillance environment 100 in FIG. 1 and surveillance environment 200 in FIG. 2 may be examples of implementations for surveillance environment 300. Further, area of interest 102 in FIG. 1 and area of interest 202 in FIG. 2 may be examples of implementations for area of interest 302.

Area of interest 302 may take a number of different forms, depending on the implementation. Area of interest 302 may take the form of an area of terrain, an urban area, a neighborhood, an area of a city, a mountain range, a body of water, a factory environment, an interior of a building, or some other type of area.

In this illustrative example, persistent surveillance system 304 may be used to monitor area of interest 302. In particular, persistent surveillance system 304 may be used to perform persistent surveillance 306 of area of interest 302. Persistent surveillance 306 may be surveillance that is performed substantially continuously over a prolonged period of time. Persistent surveillance 306 may also be referred to as persistent intelligence, surveillance, and reconnaissance (ISR).

Persistent surveillance system 304 may include set of sensor platforms 308, map manager 310, and controller 312. Each of set of sensor platforms 308 may be implemented in a number of different ways. In one illustrative example, set of sensor platforms 308 may take the form of set of unmanned aerial vehicles (UAVs) 314. Set of sensor platforms 104 in FIG. 1 and set of sensor platforms 204 in FIG. 2 may be examples of implementations for set of sensor platforms 308.

In this illustrative example, set of sensor systems 316 may be associated with set of sensor platforms 308. As used herein, when one component is "associated" with another component, the association is a physical association in the depicted examples.

For example, a first component, such as one of set of sensor systems 316, may be considered to be associated with a second component, such as one of set of sensor platforms 308, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Set of sensor systems 111 in FIG. 1 and set of sensor systems 211 in FIG. 2 may be examples of implementations for set of sensor systems 316. In one illustrative example, set of sensor systems 316 may take the form of set of imaging systems 318 attached to set of sensor platforms 308. For example, without limitation, each of set of imaging systems 318 may be attached to a corresponding one of set of sensor platforms 308.

Each sensor system in set of sensor systems 316 may generate surveillance data for a portion of area of interest 302 in a line of sight of that sensor system. The portion of area of interest 302 in the line of sight of the sensor system may change over time as the sensor system moves along a path over area of interest 302.

Depending on the implementation, each sensor system in set of sensor systems 316 may be implemented in a number of different ways. For example, without limitation, each sensor system in set of sensor systems 316 may comprise at least one of an imaging system, a radar imaging system, a laser imaging system, an infrared (IR) imaging system, an ultraviolet (UV) imaging system, an electro-optical (EO) imaging system, or some other type of sensor system.

Each of map manager 310 and controller 312 may be implemented using hardware, software, firmware, or a combination thereof. In one illustrative example, map manager 310 and controller 312 may be implemented using computer system 320. Computer system 320 may be comprised of one or more computers. When more than one computer is present, these computers may be in communication with each other.

In one illustrative example, computer system 320 may be distributed across set of sensor platforms 308. For example, computer system 320 may include a computer located onboard each of set of sensor platforms 308. In some cases, at least a portion of each of map manager 310 and controller 312 may be implemented on each of these computers. In other cases, map manager 310 and controller 312 may be implemented on one of the computers onboard a particular one of set of sensor platforms 308, thereby making this sensor platform a primary sensor platform.

In another illustrative example, computer system 320 may be implemented remotely with respect to set of sensor platforms 308. For example, without limitation, computer system 320 may be located at a ground station. In this example, computer system 320 may be configured to communicate wirelessly with each of set of sensor platforms 308.

Map manager 310 and controller 312 may be used to control the routing of set of sensor platforms 308 over area of interest 302. Map manager 310 and controller 312 may communicate with each other to control the routing of set of sensor platforms 308 over area of interest 302.

In this illustrative example, map manager 310 may create visibility map 322. Visibility map 322 may also be referred to as viewshed map 324. Viewshed map 324 may also be referred to as a viewshed image or simply, a viewshed. Viewshed map 324 may take the form of, for example, without limitation, a raster image comprised of columns and rows.

As depicted, visibility map 322 may include plurality of grid points 326 that represent plurality of locations 328 in area of interest 302. In particular, plurality of locations 328 may be locations on surface 305 of area of interest 302. Surface 305 may include the ground, the surfaces of the tops of buildings, the surfaces of roads, the surface of water, or some combination thereof.

Visibility map 322 may also include plurality of values 331 for plurality of grid points 326. Map manager 310 may assign plurality of values 331 to visibility map 322 based on elevation map 330. Elevation map 330 identifies a surface elevation for each of plurality of locations 328. The surface elevation at a particular location in plurality of locations 328 may be the height of the surface 305 at the particular location or the height of a building or other type of man-made structure present at the particular location. Elevation map 330 may take the form of, for example, without limitation, a digital elevation model (DEM), a heightmap, or a heightfield.

When visibility map 322 is first created, map manager 310 may use elevation map 330 to assign initialization value 333 to each of plurality of grid points 326 to plurality of values 331. Initialization value 333 may be, for example, selected minimum value 335.

In one illustrative example, plurality of values 331 for visibility map 322 may be time-based values. In this example, initialization value 333 may be a selected minimum time value, such as the time at which visibility map 322 is created. For example, initialization value 333 may be a time value of zero. Visibility map 322 may be updated over time by map manager 310 as each of set of sensor platforms 308 moves along a corresponding route for that sensor platform. In this manner, visibility map 322 may be referred to as dynamic visibility map 345 in FIG. 3.

In this illustrative example, controller 312 may control set of routes 332 for set of sensor platforms 308. In particular, controller 312 may control set of routes 332 for set of sensor platforms 308 in a manner that yields a highest collective visibility 334 of area of interest 302 for set of sensor platforms 308. Collective visibility 334 may be determined based on the number of locations within area of interest 302 that may be visible to at least one of set of sensor platforms 308. For example, at any given point in time, collective visibility 334 of area of interest 302 for set of sensor platforms 308 may be measured based on the number of locations within area of interest 302 that are visible to at least one of set of sensor platforms 308 at that given point in time. As the number of locations that are visible increases, collective visibility 334 increases.

As one illustrative example, set of sensor platforms 308 may include sensor platform 336. Sensor system 338 may be associated with sensor platform 336. Sensor system 338 may be an example of one of set of sensor systems 316. In some illustrative examples, sensor system 338 takes the form of imaging system 340, which may be an example of one of set of imaging systems 318.

Controller 312 may use visibility map 322 to control route 342 of sensor platform 336. Route 342 may be the path along which sensor platform 336 may move relative to area of interest 302 when performing persistent surveillance 306.

Controller 312 may use visibility map 322 and elevation map 330 to create plurality of route segments 344 for route 342. For example, sensor platform 336 may be at current position 346. Controller 312 may identify plurality of candidate positions 348 to which sensor platform 336 may be moved based on current position 346. In one illustrative example, plurality of candidate positions 348 may be identified as selected number of positions 350 in which each of the positions has a substantially equal distance from current position 346 of sensor platform 336. Selected number of positions 350 may be, for example, without limitation, two, three, four, seven, nine, fifteen, thirty, fifty, or some other number of positions.

Controller 312 may use visibility map 322 and elevation map 330 to identify next position 352 for sensor platform 336 from plurality of candidate positions 348. Controller 312 creates route segment 354 between current position 346 and next position 352. Controller 312 may then command sensor platform 336 to move along route segment 354 from current position 346 to next position 352. For example, without limitation, controller 312 may send number of commands 356 to sensor platform 336 to cause sensor platform 336 to move along route segment 354.

Each of set of sensor platforms 308 may be controlled in a similar manner. Visibility map 322 may be updated over time as each of set of sensor platforms 308 moves along its corresponding route.

Map manager 310 may update visibility map 322 continuously or periodically. When updated periodically, map manager 310 may update visibility map 322 in response to the occurrence of some event. The event may be, for example, without limitation, the lapse of a selected period of time, receiving a command, receiving a message, receiving user input, or some other type of event.

For a selected time, map manager 310 may evaluate each grid point in plurality of grid points 326 to update visibility map 322. For each grid point in plurality of grid points 326, map manager 310 may determine whether a location in area of interest 302 corresponding to that grid point is visible to at least one of set of sensor platforms 308 at the selected time. A new value corresponding to the selected time may be assigned to the grid point if the location is visible by at least one of the set of sensor platforms at the selected time. Otherwise, a current value assigned to the grid point is preserved.

In this manner, set of sensor platforms 308 may be coordinated and positioned for performing persistent surveillance 306 in a manner that yields the highest collective visibility 334 of area of interest 302 over time. With this type of coordination of set of sensor platforms 308, the number of sensor platforms included in set of sensor platforms 308 may be changed over time, while still maintaining a relatively high collective visibility 334 over time.

For example, without limitation, sensor platforms may join in or drop out of set of sensor platforms 308 performing persistent surveillance. Because visibility map 322 tracks the history of the overall visibility of plurality of locations 328 of area of interest over time to set of sensor platforms 308 as a whole, changes in the number of sensor platforms in set of sensor platforms 308 may not affect the coordination of set of sensor platforms 308 to provide a high collective visibility 334 outside of selected tolerances.

In some cases, prioritization map 360 may be used to further prioritize a certain portion of area of interest 302. Prioritization map 360 may have a plurality of grid points similar to plurality of grid points 326. In one illustrative example, each of the grid points in prioritization map 360 may be assigned a weighting factor. Grid points corresponding to locations in area of interest 302 that may have a higher priority may be assigned a greater weighting factor than grid points corresponding to locations in area of interest 302 having a lower priority. Controller 312 may use prioritization map 360 to selectively choose next position 352 described above.

The illustration of surveillance environment 300 and persistent surveillance system 304 in FIG. 3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
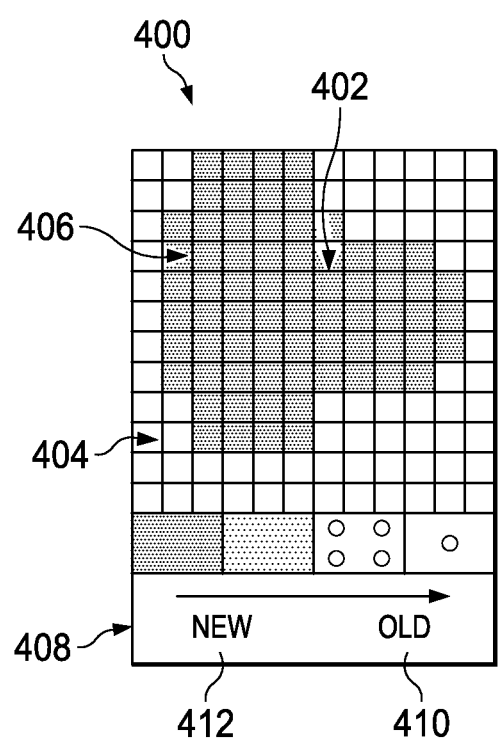
FIG. 4 is an illustration of a visibility map in accordance with an illustrative embodiment.

With reference now to FIG. 4, an illustration of a visibility map is depicted in accordance with an illustrative embodiment. In this illustrative example, visibility map 400 may be an example of one implementation for visibility map 322 in FIG. 3. Visibility map 400 may have plurality of grid points 402. Plurality of grid points 402 may be an example of one implementation for plurality of grid points 326 in FIG. 3.

Visibility map 400 may be a map for a set of sensor platforms that has been updated once. Each of plurality of grid points 402 may have one of initialization value 410 or new updated value 412, as shown in legend 408. In this illustrative example, portion 404 of plurality of grid points 402 has initialization value 410 and portion 406 of plurality of grid points 402 has new updated value 412.

A grid point in plurality of grid points 402 has initialization value 410 when the location of an area of interest corresponding to the grid point is not visible by any of the set of sensor platforms. A grid point in plurality of grid points 402 has new updated value 412 when the location of the area of interest corresponding to the grid point is visible by at least one of the set of sensor platforms.

Both initialization value 410 and new updated value 412 may correspond to time. For example, initialization value 410 may correspond to a time value of zero. In other words, a grid point having initialization value 410 indicates that the location corresponding to the grid point has not been visible even once since the creation of visibility map 400.

New updated value 412 may correspond to a particular time after zero. In particular, a grid point having new updated value 412 indicates that the location corresponding to the grid point was visible at the particular time. In some cases, new updated value 412 may correspond to a range of time values after zero. For example, a grid point having new updated value 412 may indicate that the location corresponding to the grid point was visible at least once within a particular time interval.

Figure 5:
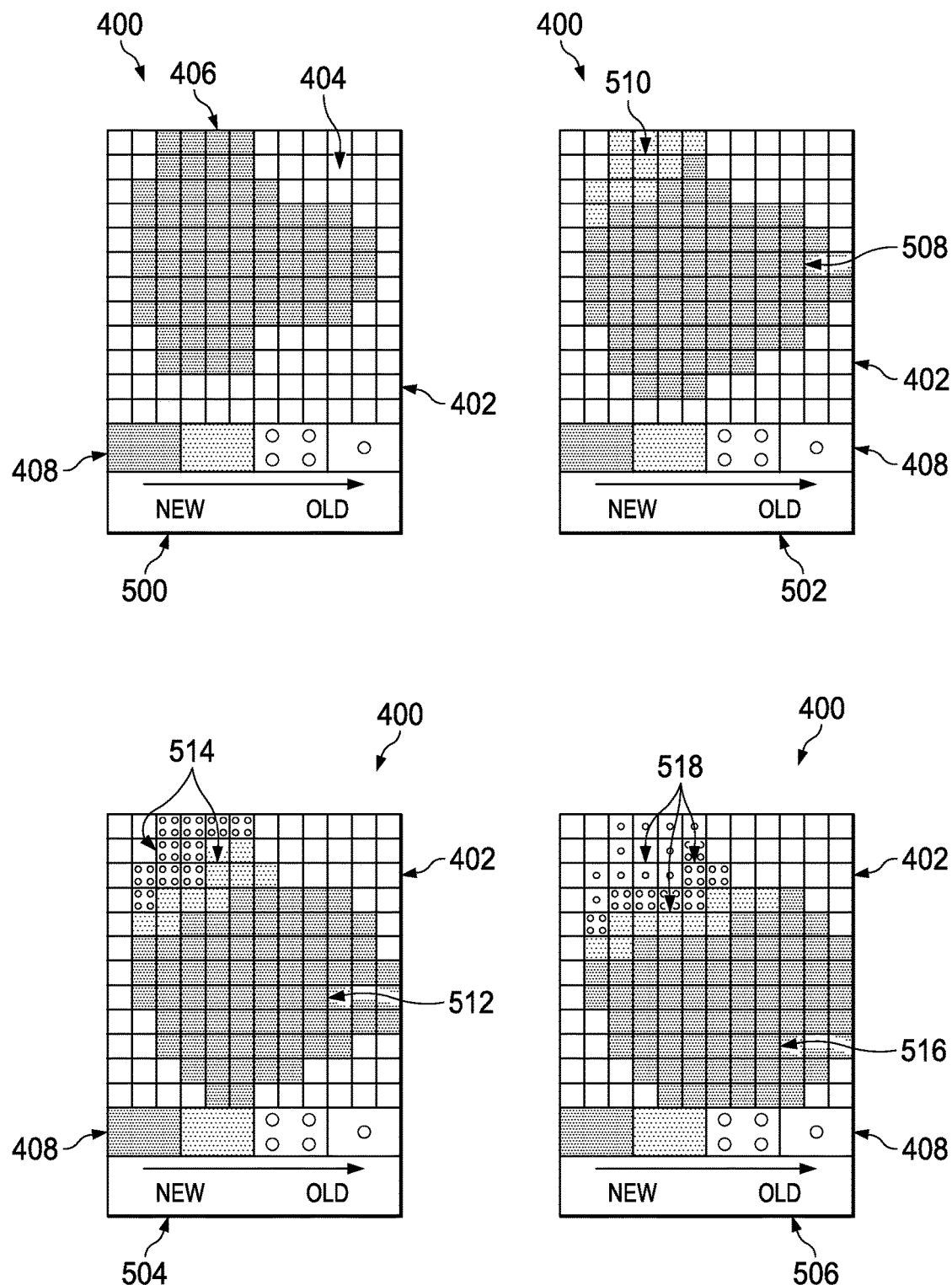
FIG. 5 is an illustration of a history of updates to a visibility map in accordance with an illustrative embodiment.

With reference now to FIG. 5, an illustration of a history of updates to a visibility map is depicted in accordance with an illustrative embodiment. In this illustrative example, a history of further updates to visibility map 400 from FIG. 4 is shown. For example, update 500, update 502, update 504, and update 506 to visibility map 400 from FIG. 4 are depicted.

As depicted, the different values for grid points in plurality of grid points 402 are depicted as different dot patterns. In other illustrative examples, the different values for the grid points may be depicted as different colors. In still other illustrative examples, the values for the grid points may be actual timestamps.

Update 500 may be performed at a first selected time, $t_1 = t_x + \Delta$, where $t_x$ is the time at which visibility map 400 was created. As depicted, the location corresponding to each grid point in portion 406 of plurality of grid points 402 has been identified as being visible to at least one of the set of sensor platforms at the first selected time. However, a location corresponding to each grid point in portion 404 of plurality of grid points 402 may not be visible to any sensor platforms at the first selected time. These decisions regarding visibility may be made using an elevation map and a current position of each of the set of sensor platforms.

Update 502 may be performed at a second selected time, $t_2 = t_1 + \Delta$. As depicted, the location corresponding to each grid point in portion 508 of plurality of grid points 402 has been identified as being visible to at least one of the set of sensor platforms at the second selected time. Each grid point in portion 508 has a new value. However, the location corresponding to each grid point in portion 510 of plurality of grid points 402 may not be visible to any sensor platforms at the second selected time. Consequently, the current value of each grid point in portion 510 is preserved. Portion 510 includes grid points that retain the initialization value.

Similarly, update 504 may be performed at a third selected time, $t_3 = t_2 + \Delta$. As depicted, the location corresponding to each grid point in portion 512 of plurality of grid points 402 has been identified as being visible to at least one of the set of sensor platforms at the third selected time. Each grid point in portion 512 has a new value. However, the location corresponding to each grid point in portion 514 of plurality of grid points 402 may not be visible to any sensor platforms at the third selected time. Consequently, the current values of these grid points are preserved.

Further, update 506 may be performed at a fourth selected time, $t_4 = t_3 + \Delta$. As depicted, the location corresponding to each grid point in portion 516 of plurality of grid points 402 has been identified as being visible to at least one of the set of sensor platforms at the fourth selected time. Each grid point in portion 516 has a new value. However, the location corresponding to each grid point in portion 518 of plurality of grid points 402 may not be visible to any sensor platforms at the fourth selected time. Consequently, the current values of these grid points are preserved.

Figure 6:
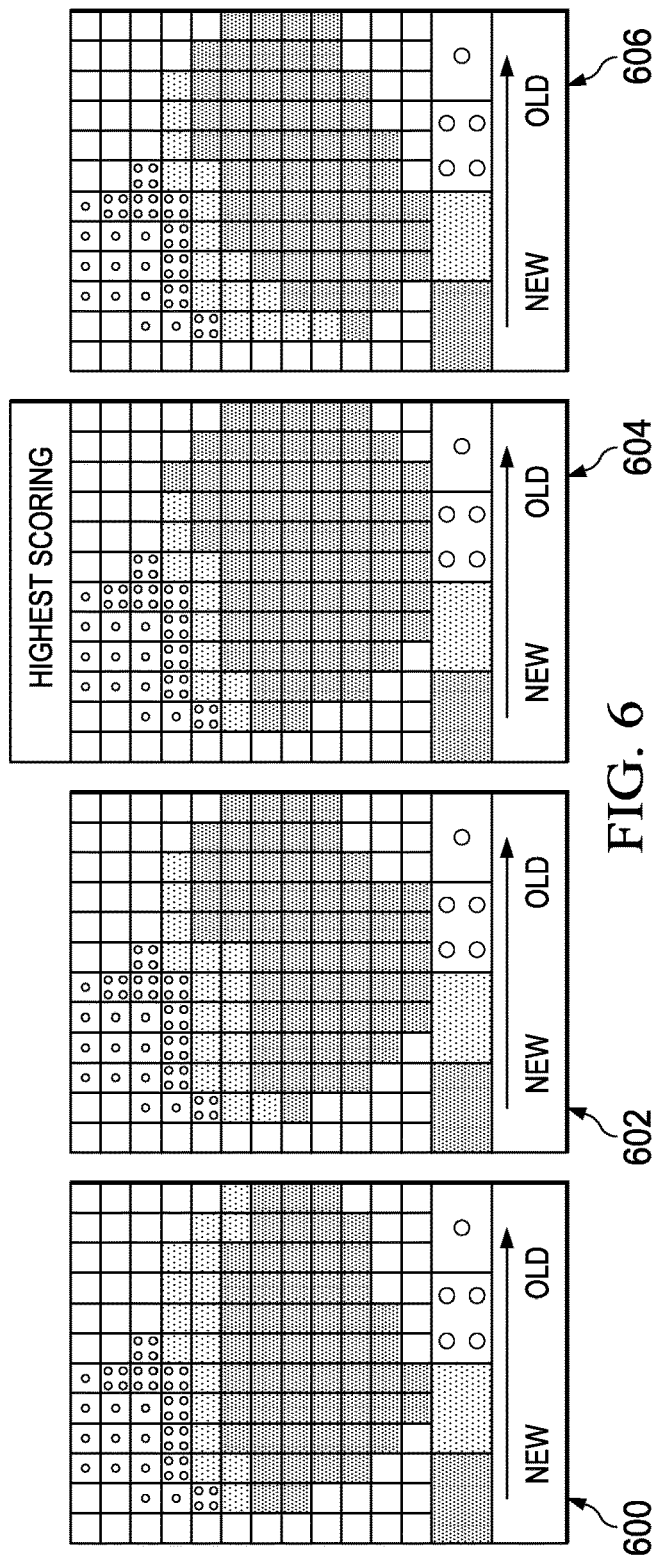
FIG. 6 is an illustration of candidate visibility maps in accordance with an illustrative embodiment.

With reference now to FIG. 6, an illustration of candidate visibility maps is depicted in accordance with an illustrative embodiment. In this illustrative example, candidate visibility maps 600, 602, 604, and 606 may be created for a plurality of candidate positions for moving a sensor platform. A score may be generated for each of the plurality of candidate positions based on these visibility maps. The candidate position having the highest score may be selected as the next position for the sensor platform. The highest-scoring candidate position may be the candidate position corresponding to the candidate visibility map indicating a highest collective visibility. In this illustrative example, the candidate position corresponding to candidate visibility map 604 may be the highest-scoring candidate position. An example of one manner in which a score may be generated for each of a plurality of candidate positions is described in greater detail in FIG. 10.

Figure 7:
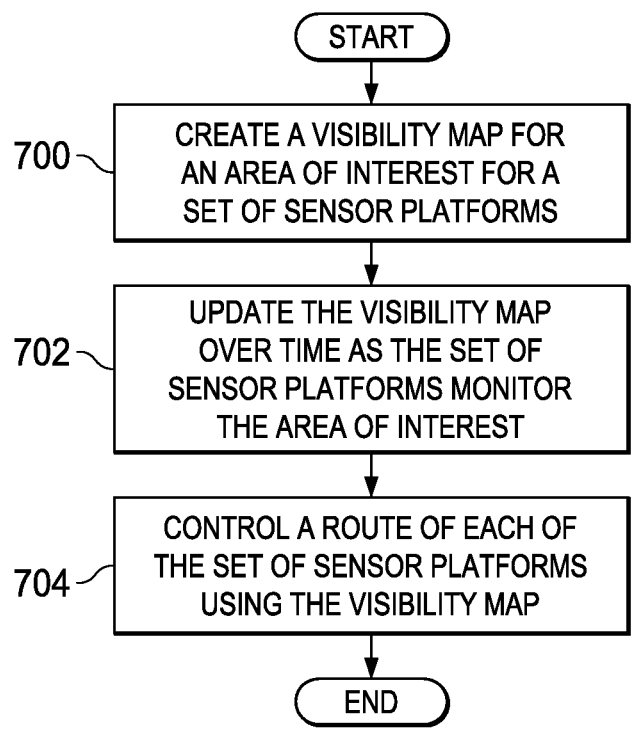
FIG. 7 is an illustration of a process for controlling a set of sensor platforms in the form of a flowchart in accordance with an illustrative embodiment.

With reference now to FIG. 7, an illustration of a process for controlling a set of sensor platforms is depicted in the form of a flowchart in accordance with an illustrative embodiment. The process illustrated in FIG. 7 may be implemented to control, for example, without limitation, set of sensor platforms 308 in FIG. 3 to perform persistent surveillance 306 in FIG. 3.

The process may begin by creating a visibility map for an area of interest for a set of sensor platforms (operation 700). The visibility map may be updated over time as the set of sensor platforms monitor the area of interest (operation 702). A route of each of the set of sensor platforms may be controlled using the visibility map (operation 704), with the process terminating thereafter.

Figure 8:
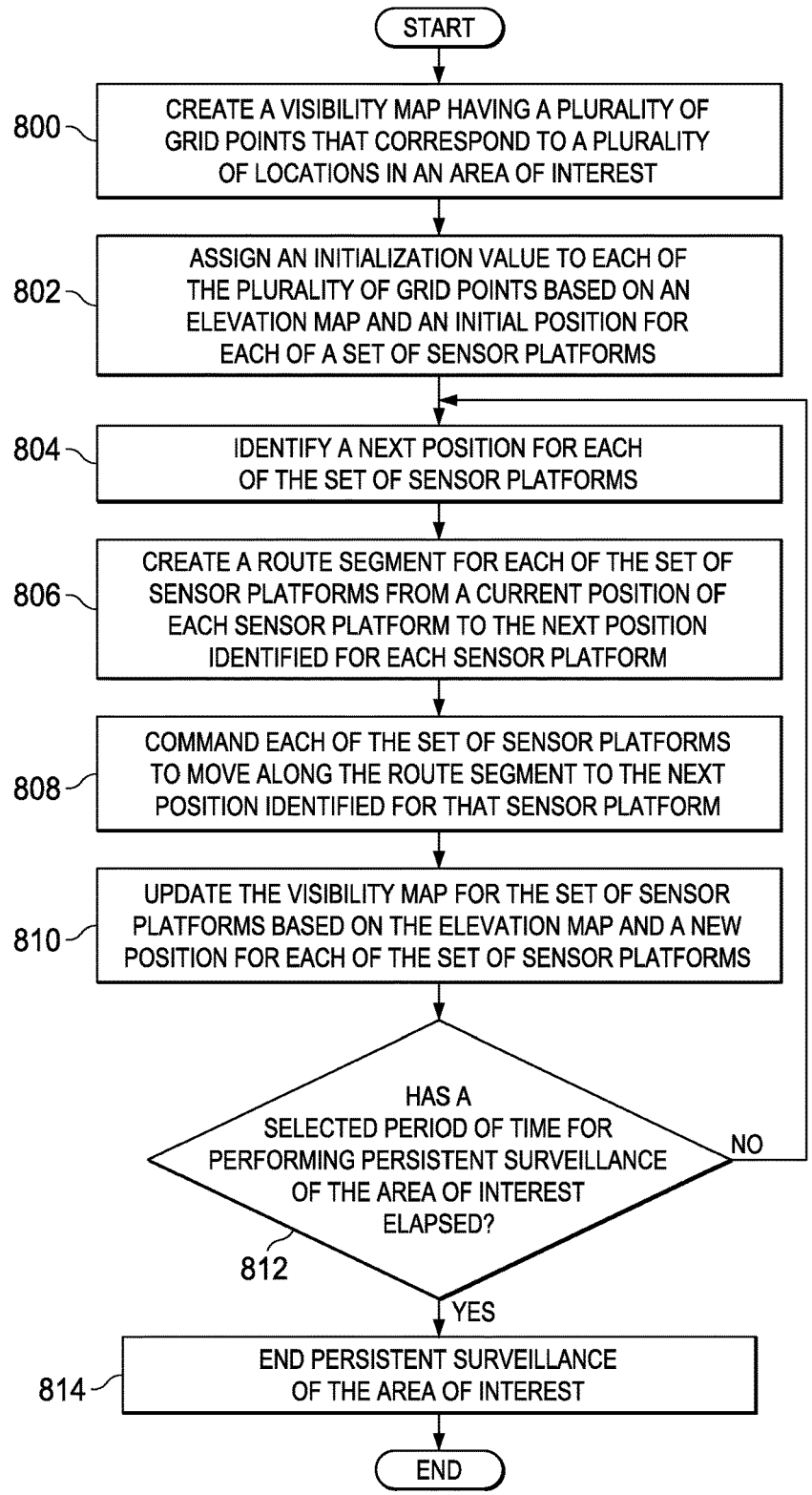
FIG. 8 is an illustration of a process for performing persistent surveillance in the form of a flowchart in accordance with an illustrative embodiment.

With reference now to FIG. 8, an illustration of a process for performing persistent surveillance is depicted in the form of a flowchart in accordance with an illustrative embodiment. The process illustrated in FIG. 8 may be implemented to control, for example, without limitation, set of sensor platforms 308 in FIG. 3 to perform persistent surveillance 306 in FIG. 3.

The process may begin by creating a visibility map having a plurality of grid points that correspond to a plurality of locations in an area of interest (operation 800). Next, an initialization value may be assigned to each of the plurality of grid points based on an elevation map and an initial position for each of a set of sensor platforms (operation 802). In this manner, in operation 802, a plurality of initialization values may be assigned to the plurality of grid points. The plurality of initialization values may also be referred to as a plurality of initialization values. The plurality of initialization values may all be a selected minimum value. For example, the selected minimum value may be a time value.

Then, a next position is identified for each of the set of sensor platforms (operation 804). A route segment is created for each of the set of sensor platforms from a current position of each sensor platform to the next position identified for each sensor platform (operation 806). Each of the set of sensor platforms is commanded to move along the route segment to the next position identified for that sensor platform (operation 808).

Thereafter, the visibility map is updated for the set of sensor platforms based on the elevation map and a new position for each of the set of sensor platforms (operation 810). A determination may then be made as to whether a selected period of time for performing persistent surveillance of the area of interest has elapsed (operation 812). If the selected period of time has not elapsed, the process proceeds to operation 804 described above. Otherwise, persistent surveillance of the area of interest is ended (operation 814), with the process terminating thereafter.

Figure 9:
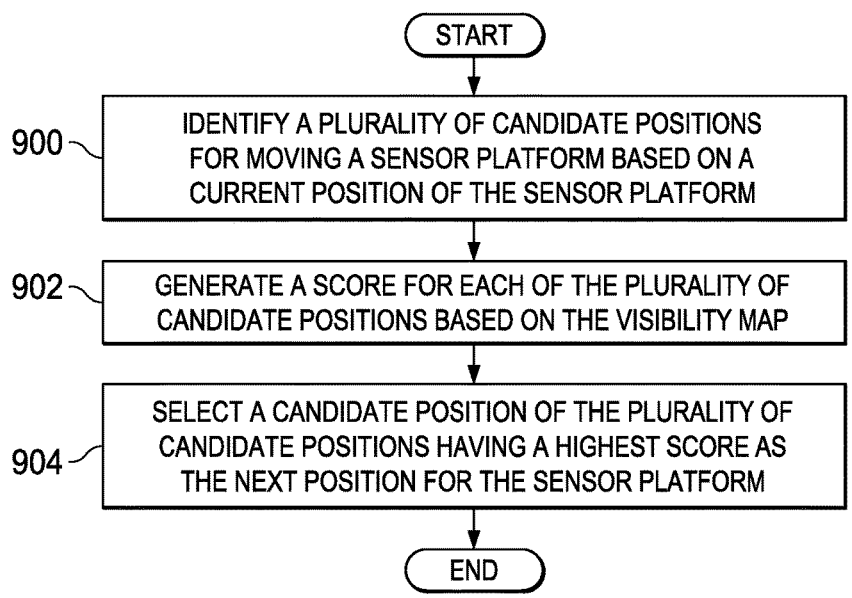
FIG. 9 is an illustration of a process for identifying a next position for a sensor platform in the form of a flowchart in accordance with an illustrative embodiment.

With reference now to FIG. 9, an illustration of a process for identifying a next position for a sensor platform is depicted in the form of a flowchart in accordance with an illustrative embodiment. The process illustrated in FIG. 9 may be an example of one manner in which operation 804 in FIG. 8 may be implemented. This process may be performed to identify a next position along a route for each of a set of sensor platforms.

The process may begin by identifying a plurality of candidate positions for moving a sensor platform based on a current position of the sensor platform (operation 900). Next, a score is generated for each of the plurality of candidate positions based on the visibility map (operation 902). A candidate position of the plurality of candidate positions having a highest score is selected as the next position for the sensor platform (operation 904), with the process terminating thereafter.

Figure 10:
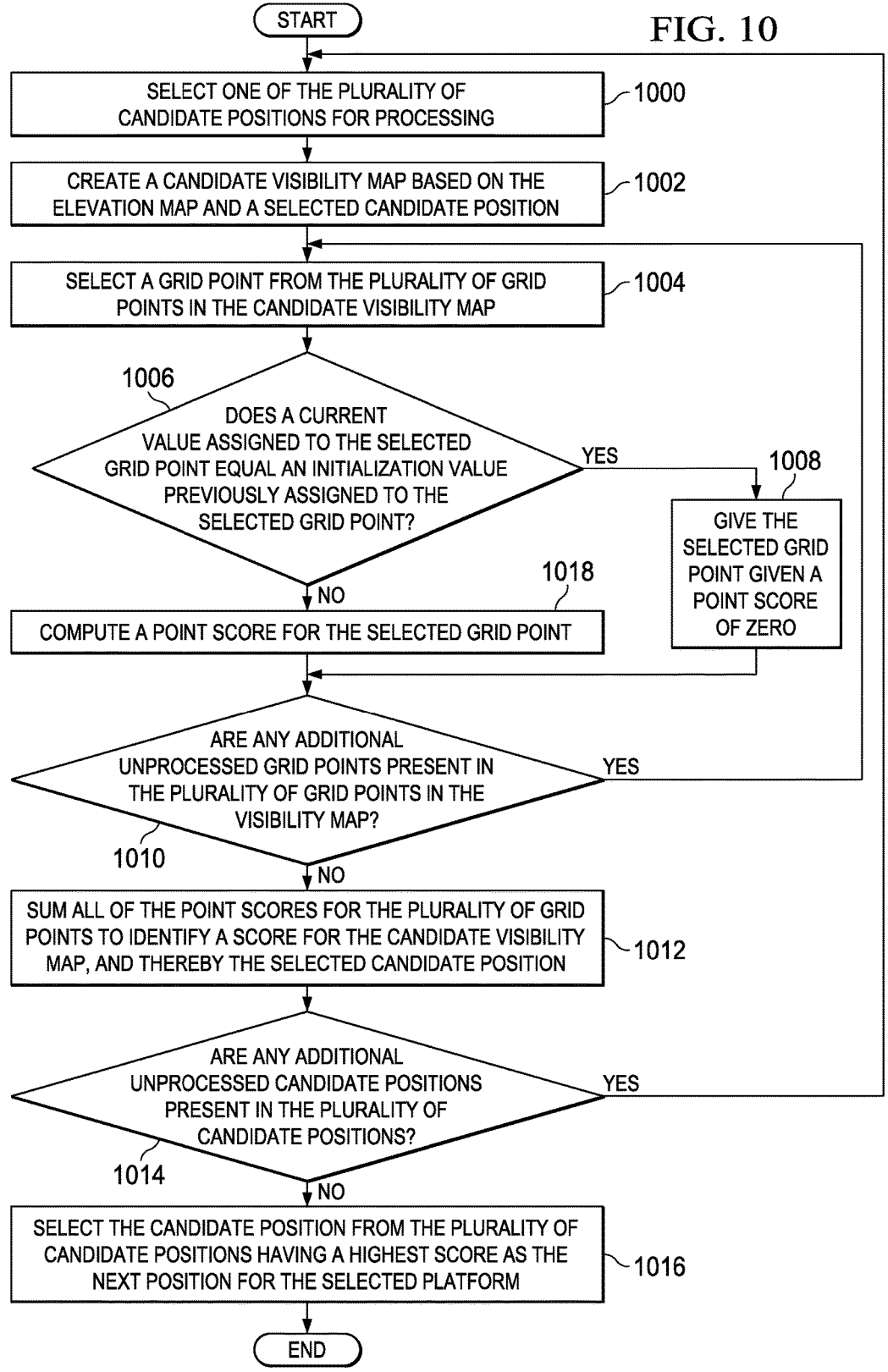
FIG. 10 is an illustration of a process for scoring a plurality of candidate positions in the form of a flowchart in accordance with an illustrative embodiment.

With reference now to FIG. 10, an illustration of a process for scoring a plurality of candidate positions is depicted in the form of a flowchart in accordance with an illustrative embodiment. The process illustrated in FIG. 10 may be an example of one manner in which operation 902 in FIG. 9 may be performed.

The process may begin by selecting one of the plurality of candidate positions for processing (operation 1000). A candidate visibility map is created based on the elevation map and a selected candidate position (operation 1002). In operation 1002, the visibility map is temporarily updated based on the selected candidate position to create the candidate visibility map.

Thereafter, a grid point from the plurality of grid points in the candidate visibility map is selected (operation 1004). A determination may be made as to whether a current value assigned to the selected grid point equals an initialization value previously assigned to the selected grid point (operation 1006).

If the current value equals the initialization value, the selected grid point is given a point score of zero (operation 1008). A determination may then be made as to whether any additional unprocessed grid points are present in the plurality of grid points in the visibility map (operation 1010). If no additional unprocessed grid points are present, the process sums all of the point scores for the plurality of grid points to identify a score for the candidate visibility map, and thereby the selected candidate position (operation 1012).

A determination may then be made as to whether any additional unprocessed candidate positions are present in the plurality of candidate positions (operation 1014). If no additional unprocessed candidate positions are present in the plurality of candidate positions, the candidate position from the plurality of candidate positions having a highest score is selected as the next position for the selected platform (operation 1016), with the process terminating thereafter. Otherwise, if any additional unprocessed candidate positions are present, the process returns to operation 1000 as described above.

With reference again to operation 1010, if any additional unprocessed grid points are present, the process may return to operation 1004 as described above. With reference again to operation 1006, if the current value assigned to the selected grid point does not equal the initialization value, then the current value must be at least equal to or greater than a first updated value for the selected grid point. Consequently, a point score for the selected grid point is computed (operation 1018). This point score may be computed as follows:

$$\text{PointScore}[x,y] = (T[x,y] - T_{start}[x,y])^{-B}$$

where PointScore is the point score, [x,y] identifies the selected grid point, T[x,y] is the current value of the selected grid point, $T_{start}[x,y]$ is the first updated value for the selected grid point, and B is the exponential factor.

The process may then proceed to operation 1010 as described above. The process described in FIG. 10 may be performed to select the next position for the sensor platform that will yield the highest collective visibility for the set of sensor platforms over time.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
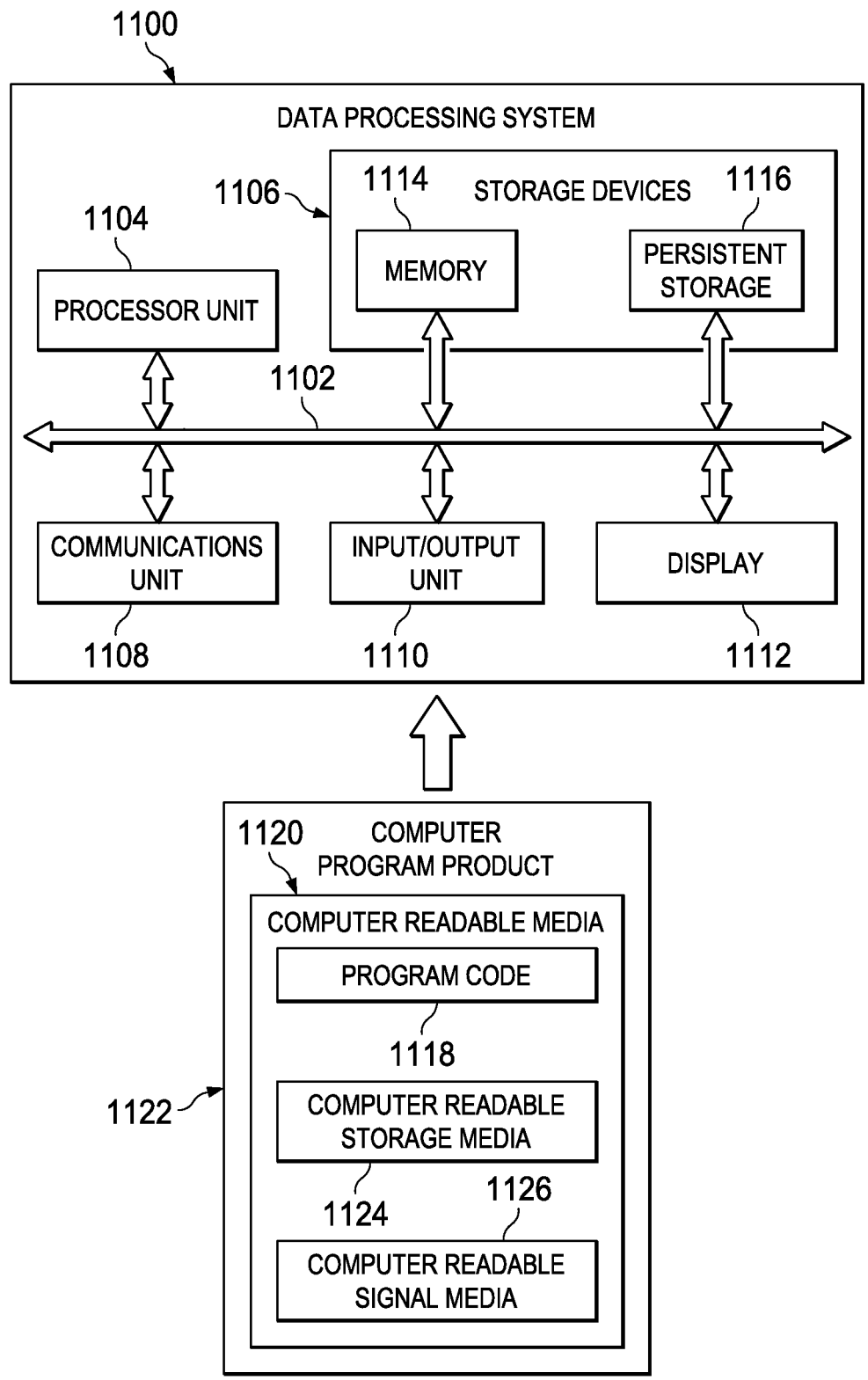
FIG. 11 is an illustration of a data processing system in the form of a block diagram in accordance with an illustrative embodiment.

Turning now to FIG. 11, an illustration of a data processing system is depicted in the form of a block diagram in accordance with an illustrative embodiment. Data processing system 1100 may be used to implement computer system 320 in FIG. 3. In some illustrative examples, data processing system 1100 may be used to implement each of map manager 310 and controller 312 in FIG. 3. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a map manager that creates a visibility map for an area of interest for a set of sensor platforms, wherein the visibility map identifies a number of locations within the area of interest that are visible to at least one sensor platform in the set of sensor platforms, and that updates the visibility map over time to change the identification of the number of locations within the area of interest that are visible to at least one sensor platform in the set of sensor platforms while the set of sensor platforms monitors the area of interest as sensor platforms in the set of sensor platforms move in positions with respect to the area of interest to change lines of sight of the sensor platforms with respect to the area of interest; and
a controller that controls a route of movement of each of the set of sensor platforms to different positions with respect to the area of interest using the visibility map by:
identifying a plurality of candidate positions for moving a sensor platform in the set of sensor platforms based on a current position of the sensor platform,
creating a plurality of candidate visibility maps comprising a candidate visibility map for each of the plurality of candidate positions, wherein each candidate visibility map in the plurality of candidate visibility maps identifies a number of locations within the area of interest that are visible to at least one sensor platform in the set of sensor platforms with the sensor platform at one of the candidate positions,
identifying a candidate visibility map in the plurality of candidate visibility maps that identifies the largest number of locations within the area of interest that are visible to at least one sensor platform in the plurality of sensor platforms as compared to other candidate visibility maps in the plurality of candidate visibility maps, and
controlling the sensor platform to move from the current position of the sensor platform to the candidate position in the plurality of candidate positions for which the candidate visibility map identifies the largest number of locations within the area of interest that are visible to at least one sensor platform in the plurality of sensor platforms.

2. The apparatus of claim 1, wherein the map manager creates the visibility map using an elevation map of the area of interest.

3. The apparatus of claim 2, wherein the map manager updates a plurality of grid points in the visibility map at a selected time based on a visibility of a location corresponding to each of the plurality of grid points to the set of sensor platforms.

4. The apparatus of claim 1 further comprising:
the set of sensor platforms.

5. The apparatus of claim 4, wherein the each of the set of sensor platforms comprises:
a sensor system that generates surveillance data for a portion of the area of interest in a line of sight of the sensor system, wherein the portion of the area of interest that is in the line of sight of the sensor system changes over time.

6. The apparatus of claim 4, wherein a quantity of sensor platforms that is in the set of sensor platforms changes over time.

7. A method for controlling a set of sensor platforms, the method comprising:
creating a visibility map for an area of interest for the set of sensor platforms, wherein the visibility map identifies a number of locations within the area of interest that are visible to at least one sensor platform in the set of sensor platforms;
updating the visibility map over time to change the number of locations within the area of interest that are visible to at least one sensor platform in the set of sensor platforms as the set of sensor platforms monitor the area of interest while sensor platforms in the set of sensor platforms move in positions with respect to the area of interest to change lines of sight of the sensor platforms with respect to the area of interest; and
controlling a route of movement of each of the set of sensor platforms to different positions with respect to the area of interest using the visibility map by:
identifying a plurality of candidate positions for moving a sensor platform in the set of sensor platforms based on a current position of the sensor platform,
creating a plurality of candidate visibility maps comprising a candidate visibility map for each of the plurality of candidate positions, wherein each candidate visibility map in the plurality of candidate visibility maps identifies a number of locations within the area of interest that are visible to at least one sensor platform in the set of sensor platforms with the sensor platform at one of the candidate positions,
identifying a candidate visibility map in the plurality of candidate visibility maps that identifies the largest number of locations within the area of interest that are visible to at least one sensor platform in the plurality of sensor platforms as compared to other candidate visibility maps in the plurality of candidate visibility maps, and
controlling the sensor platform to move from the current position of the sensor platform to the candidate position in the plurality of candidate positions for which the candidate visibility map identifies the largest number of locations within the area of interest that are visible to at least one sensor platform in the plurality of sensor platforms.

8. The method of claim 7, wherein creating the visibility map comprises:
creating the visibility map for the area of interest using an elevation map of the area of interest.

9. The method of claim 7, wherein creating the visibility map comprises:
creating the visibility map having a plurality of grid points that correspond to a plurality of locations in the area of interest; and
assigning an initialization value to each of the plurality of grid points.

10. The method of claim 9, wherein assigning the initialization value comprises:
assigning a selected minimum value to each grid point in the plurality of grid points.

11. The method of claim 9, wherein updating the visibility map over time comprises:
determining whether a location in the area of interest corresponding to a grid point in the plurality of grid points is visible to at least one of the set of sensor platforms at a selected time; and
assigning a new value corresponding to the selected time to the grid point in response to a determination that the location is visible by the at least one of the set of sensor platforms at the selected time.

12. The method of claim 11, wherein determining whether the location is visible to the at least one of the set of sensor platforms comprises:
determining whether the at least one of the set of sensor platforms has a line of sight to the location in the area of interest corresponding to the grid point based on an elevation map and a current position of the each of the set of sensor platforms.

13. The method of claim 11, wherein updating the visibility map over time further comprises:
preserving a current value assigned to the grid point in response to a determination that the location is not visible by the at least one of the set of sensor platforms at the selected time.

14. The method of claim 7 further comprising:
generating a score for each of the plurality of candidate positions using the corresponding candidate visibility map for each of the plurality of candidate positions; and
selecting the candidate position from the plurality of candidate positions having a highest score as a next position for the sensor platform.

15. The method of claim 7, wherein controlling the route of the each of the set of sensor platforms further comprises:
creating a route segment for a corresponding route for the sensor platform between the current position of the sensor platform and the candidate position in the plurality of candidate positions for which the candidate visibility map identifies the largest number of locations within the area of interest that are visible to at least one sensor platform in the plurality of sensor platforms; and
sending a number of commands to the sensor platform to cause the sensor platform to move along the route segment.

16. The method of claim 7, wherein identifying the plurality of candidate positions comprises:
identifying a selected number of positions as the plurality of candidate positions in which each of the selected number of positions has a substantially equal distance from the current position of the sensor platform.

17. A persistent surveillance system comprising:
a set of sensor platforms that monitor an area of interest, wherein the set of sensor platforms comprises a set of unmanned aerial vehicles associated with a set of sensor systems;
a map manager that creates a visibility map for the area of interest for the set of sensor platforms, wherein the visibility map identifies a number of locations within the area of interest that are visible to at least one sensor platform in the set of sensor platforms, and that updates the visibility map over time to change the number of locations within the area of interest that are visible to at least one sensor platform in the set of sensor platforms while the set of sensor platforms monitors the area of interest as sensor platforms in the set of sensor platforms move in positions with respect to the area of interest to change lines of sight of the sensor platforms with respect to the area of interest; and a controller that controls a route of movement of each of the set of sensor platforms using the visibility map to achieve a highest collective visibility of the area of interest over time.

18. The persistent surveillance system of claim 17 wherein the set of sensor systems comprises a set of imaging systems.

19. The apparatus of claim 4 wherein the set of sensor platforms comprises a set of unmanned aerial vehicles.

20. The method of claim 7, wherein the set of sensor platforms comprises a set of unmanned aerial vehicles.

* * * * *